Aug. 13, 1940.　　　　L. J. JORDAN　　　　2,210,920
REEL
Original Filed Feb. 1, 1936　　　3 Sheets-Sheet 1
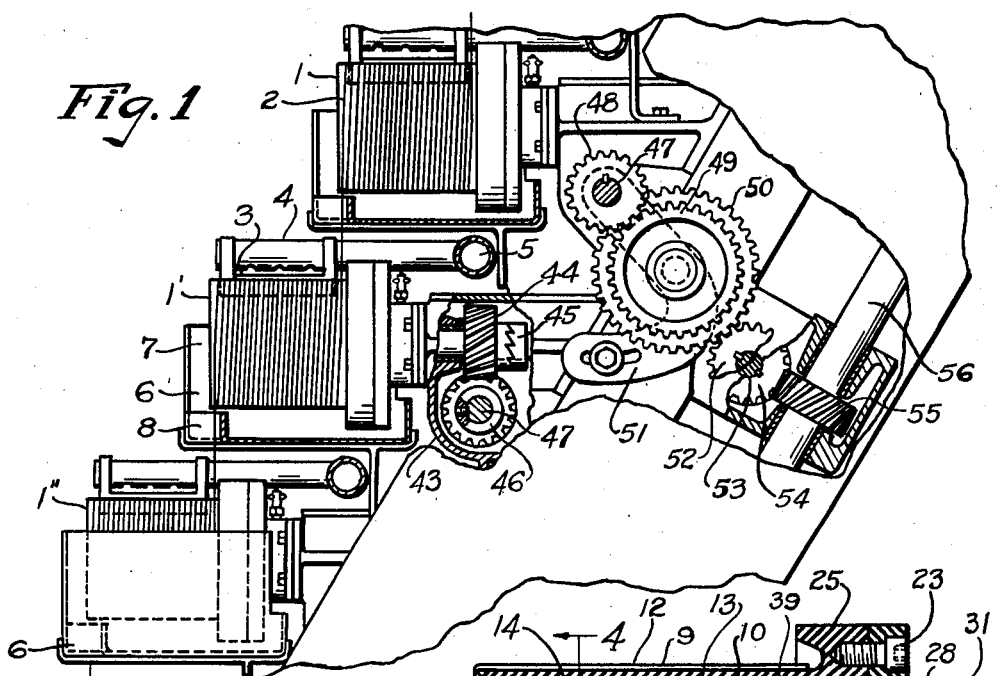
Fig. 1
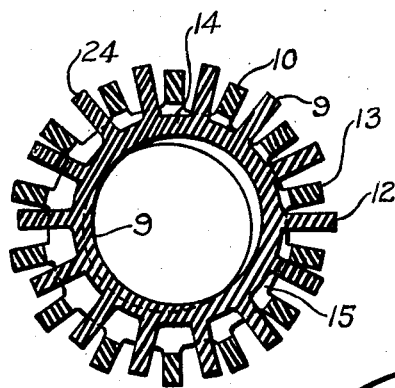
Fig. 4
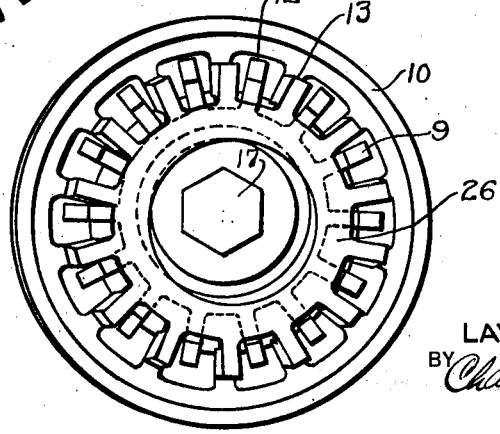
Fig. 2
Fig. 3
INVENTOR
LAVERN J. JORDAN
BY *Charles E. Herrstrom*
ATTORNEY Aug. 13, 1940.    L. J. JORDAN    2,210,920
REEL
Original Filed Feb. 1, 1936    3 Sheets-Sheet 2
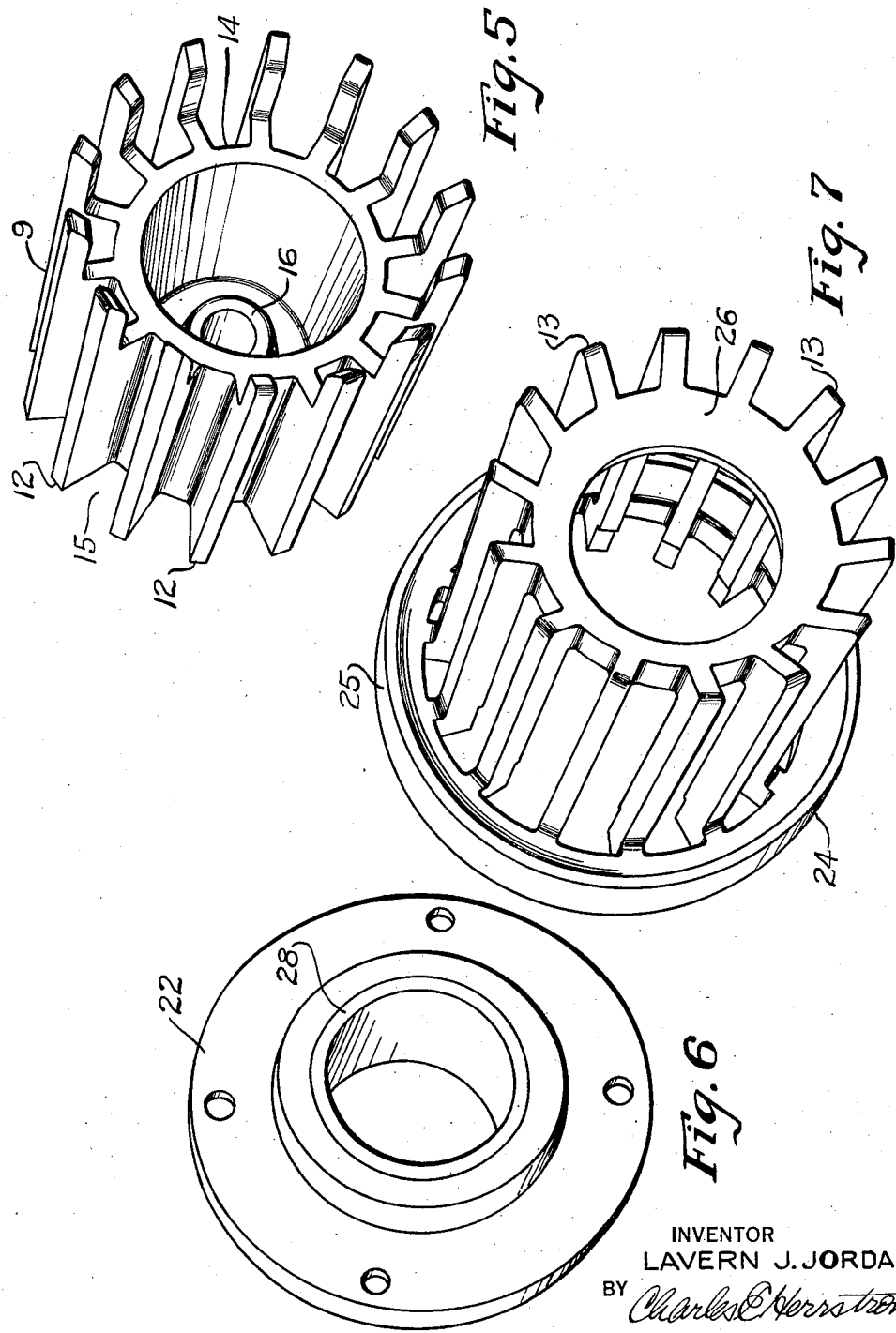
INVENTOR
LAVERN J. JORDAN
BY Charles E. Herrstrom
ATTORNEY

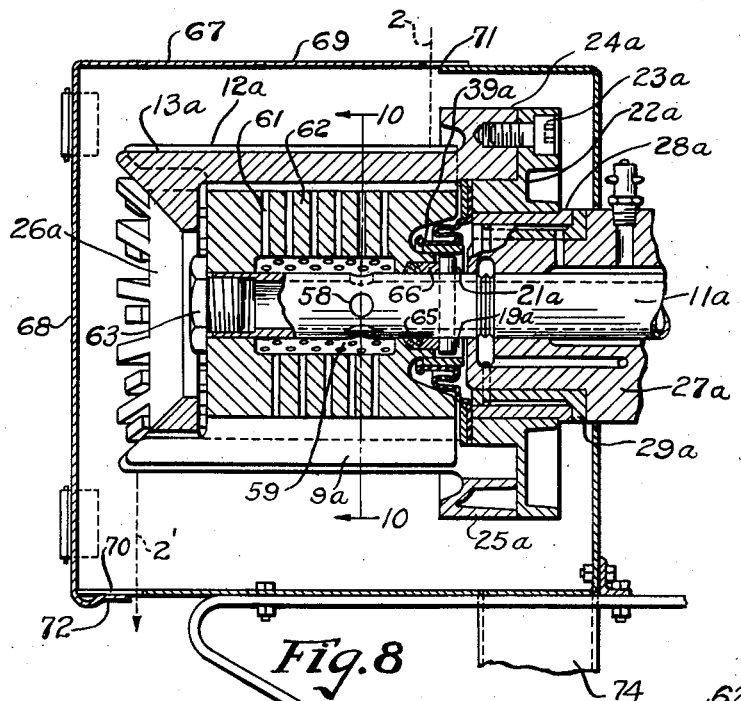
Fig. 8
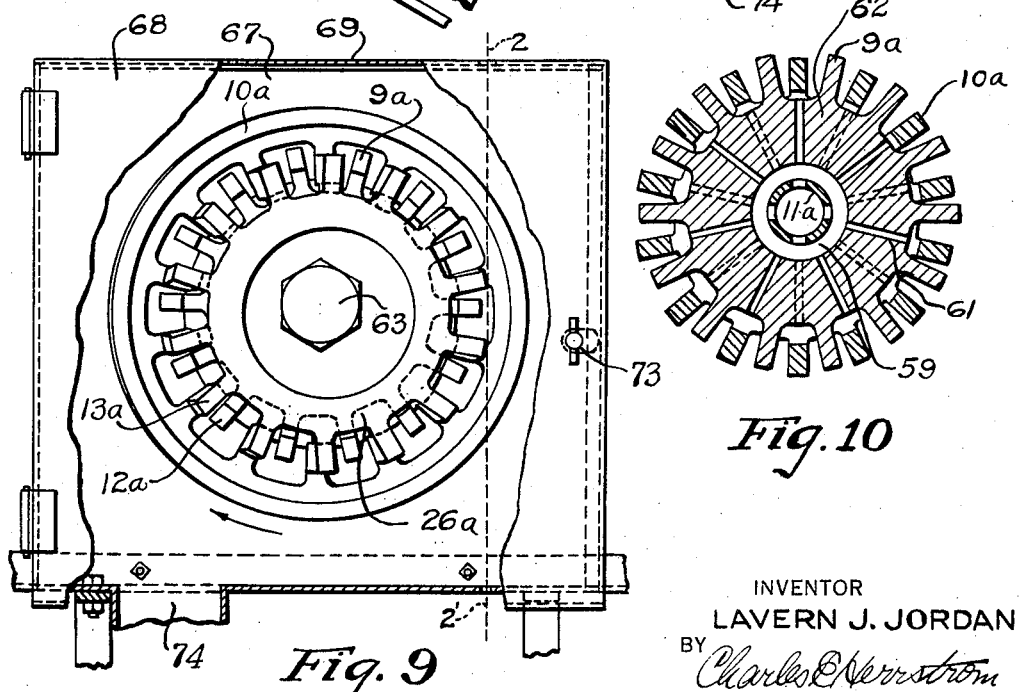
Fig. 9
Fig. 10
INVENTOR
LAVERN J. JORDAN
BY Charles E Herrstrom
ATTORNEY Patented Aug. 13, 1940

2,210,920

UNITED STATES PATENT OFFICE 2,210,920

REEL

Lavern J. Jordan, Fairview, Ohio, assignor to Industrial Rayon Corporation, Cleveland, Ohio, a corporation of Delaware Application February 1, 1936, Serial No. 61,954
Renewed July 18, 1939

20 Claims. (Cl. 242—53)

This invention relates to a form of reel on which thread, filaments, ropes, bands, tapes, tubes and similar articles, hereinafter referred to as "thread" may, by the action of the elements of the reel during rotation, be continuously wound and advanced axially of the reel in a plurality of helical or generally helical turns. The reel of the present invention constitutes an improvement on the reel shown, described and claimed in a prior application entitled "Winding reel," Serial No. 652,089, filed January 16, 1933, by Walter F. Knebusch, to which reference may be had, if desired. As in said Knebusch application, the reel, broadly speaking, comprises two rigid, generally cylindrical members mounted with their axes slightly offset from and inclined to each other, the periphery of each generally cylindrical member comprising a plurality of bar members extending longitudinally of the reel, the bar members of one cylindrical member being alternately disposed to the bar members of the other cylindrical member.

In the drawings, in which are shown two embodiments of the invention and in which like reference numerals refer to like parts throughout, Figure 1 shows a plurality of reels of the kind to which the invention is directed employed in a machine for the wet processing of artificial silk thread, parts being broken away for the sake of clearness; Figure 2 is a longitudinal section, with parts in elevation, of a reel embodying the invention; Figure 3 is an end elevation thereof; Figure 4 is a section on line 4—4 of Figure 2; Figure 5 is a perspective view of one of the generally cylindrical reel members, showing the construction thereof; Figures 6 and 7 are perspective views of two of the parts going to make up the other of the generally cylindrical reel members; Figure 8 shows another form of reel likewise embodying the invention as used for dry processing or drying of thread, parts being shown in elevation; Figure 9 is an end elevation thereof; and Figure 10 is a section on line 10—10 of Figure 8.

A portion of an apparatus for the continuous processing of artificial silk thread is illustrated in Figure 1, the same comprising a plurality of reels of which three bearing reference numerals 1, 1' and 1" are shown, disposed in processing sequence. If, as is preferably the case, the reels are of cantilever form, they may be positioned in stepped arrangement, as shown, with the axes of the reels horizontal and parallel and with the end at which the thread 2 leaves each reel; i. e., the discharge end of the reel; disposed adjacent the end at which the thread 2 starts on the succeeding reel; i. e., the receiving end of such succeeding reel. The unsupported ends of all of the reels are thus presented toward the operator, whereby threading up or starting of the thread on the reels and transfer of the thread from one reel to another is greatly facilitated.

Continuous processing machines of this type may be constructed with any desired number of reels in series in stepped arrangement and with any desired number of such series adjacent each other. Suitable processing liquids may be applied to the thread stored on each reel, as by showering the same from a reagent distributor 3 positioned above each reel supplied by a pipe 4 from a conduit 5 which may extend longitudinally of the machine and which may conveniently serve all reels devoted to the same processing treatment. The processing liquid after leaving each reel may be caught in a collecting trough 6 which may also extend longitudinally of the machine and which may conveniently serve all horizontally adjacent reels. Partitions 7 may be employed between reels to prevent splashing and a re-entrant portion 8 may be provided in the front edge of the trough 6 at the discharge end of each reel to allow the thread to pass without interference to the reel below.

One form of reel which embodies the improvements of this invention and which may be used to advantage in the apparatus of Figure 1 is illustrated in Figures 2 to 7, inclusive, the last three of said figures comprising perspective views of certain of the reel members which views better illustrate the construction thereof. From Figures 2, 3 and 4 it can be seen that the reel comprises two generally cylindrical members 9 and 10. Member 9, which may be termed the "concentric member," is mounted concentrically upon and for rotation with the drive shaft 11 and has a periphery comprised of a plurality of bar members 12. Member 10, which may be termed the "eccentric member," is rotatably mounted with its axis slightly offset from and inclined to that of member 9 and has a periphery comprising a plurality of bar members 13 disposed alternately to bar members 12 of concentric member 9.

Rigidity of the generally cylindrical members 9 and 10 is of importance in insuring the correct operation of a reel of this type. The present reel provides rigidity by an improved design embodying a reinforced construction lending itself to molded or cast construction of the members making up the reel, whereby great rigidity may be obtained. Thus concentric member 9, for example, may be of rigid, integral molded or cast construction as illustrated in Figure 5, in which concentric member 9 is shown as comprising a cylindrical body portion 14 on the periphery of which are formed the longitudinally extending bar members 12 separated by slots 15.

The body portion 14 of member 9 may be made hollow, as shown, and may be provided with an integral hub 16 by means of which the member 9 may be concentrically mounted on drive shaft 11. If desired, the hub 16 may be formed and positioned as shown in Figure 2, in which case the nut 17, by means of which the member 9 is located on drive shaft 11 as by being held against shoulder 18 formed thereon, is contained within the member 9, this construction eliminating any projection beyond the end of the reel, as well as protecting the nut 17 and the drive shaft from processing liquids, etc. Member 9 is caused to rotate with drive shaft 11 by any suitable means such as that shown, comprising a slot 19 in hub 16 into which slot projects the driving pin 21 which is mounted in the drive shaft 11.

If constructed as shown, member 9 may be made extremely rigid, but considerable difficulty arises in providing an equally rigid construction for the longitudinally extending bars of eccentric member 10. Improvements provided by the present invention impart the necessary rigidity to eccentric member 10. In the construction illustrated, member 10 comprises an annular supporting member 22, shown to better advantage in Figure 6, on which is mounted, as by bolts 23, a cage-like member 24 (Figure 7). Cage-like member 24 comprises a plurality of longitudinally disposed bar members 13, the number of which is preferably equal to that of bar members 12 of member 9, which number is preferably as large as is consistent with the construction and proper operation of the reel. The bar members 13 are fixed at one end to an annular supporting ring 25, which serves to support the bar members as well as to reinforce them. It has been found that a high degree of rigidity can be provided if annular reinforcing means spaced from the supporting means are employed in conjunction with the bar members 13.

Thus in the cage-like member 24 shown in Figures 2, 3 and 4 and to better advantage in Figure 7, the annular rib 26 is fixed to the ends of the bar members 13. Member 24, as well as annular supporting member 22, may be of molded or cast construction, in which case the annular reinforcing rib 26, as well as the annular supporting and reinforcing ring 25, may be formed integral with the bar members 13, thus imparting a high degree of rigidity to eccentric member 10. However, the reinforcing means may be fastened to the bar members in other ways; for instance, they may be bolted or riveted to the bar members or be made removable after the manner of snap rings, etc.

Eccentric member 10 is mounted with its axis in the desired offset and inclined relation with respect to that of member 9 by means of annular supporting member 22. The latter is rotatably mounted on frame member 27 with its axis in the necessary offset and inclined position, drive shaft 11 being journalled or otherwise supported in frame member 27. A bearing sleeve 28 may be concentrically mounted in annular supporting member 22 to form a bearing surface. An eccentric bushing 29 may be mounted in the desired position on the frame 27, which bushing may be so formed that it has a suitable inclination of the axis of its external surface with respect to the axis of its internal surface, thus providing the desired inclination of the axes of the two reel members 9 and 10, since sleeve 28 may then be rotatably mounted on bushing 29. The use of such a bushing 29 provides convenience in machining, since the inclination of the axes may be thus provided on a part easily held in the machining apparatus, rather than on a part which would be difficult to hold, as frame member 27.

If desired, there may be provided a suitable lubricating system such as that shown, which comprises a fitting 31 communicating through channels 32, 33 and 34 with the grooves 35 in the bearing surface of bushing 29, the bearing surfaces of shaft 11 receiving lubricant from channel 33 and excess lubricant being removed by channels 36 and 37.

To protect that portion of the reel mechanism at the junction of members 9 and 10, at which point metal parts might be subjected to corrosive processing liquids, and to prevent the escape of lubricant which might stain the thread or the like stored on the reel or contaminate the processing liquid, suitable sealing means may be provided. Since there is relative oscillating movement between the two members 9 and 10, the sealing member may take the form shown in Figure 2. As can be seen from the drawing, the sealing member 39 may be fastened to reel member 10 by being clamped between the cage-like member 24 and annular supporting member 22 of reel member 10, a washer 41 being clamped therewith if desired to equalize the clamping pressure. Sealing member 39 may be fastened to reel member 9 by being mounted on a portion of the hub 16, a sleeve 42 being provided, if desired, to supply a better mounting surface for the seal.

It will be noted by reference to Figure 2 that the present reel may thus be constructed so that no processing liquid applied to the thread on the reel can damage the reel, since the reel members 9 and 10 may be constructed of materials not affected by the liquid.

Rotation of the drive shaft 11 causes the concentric reel member 9 mounted thereon to rotate therewith, whereupon contact of the bar members 12 of this reel member with the bar members 13 of eccentric reel member 10 causes the latter reel member to rotate at the same speed. The offset and inclined relationship of members 9 and 10 causes the thread to wind on the reel and form spaced helical turns which progress axially along the reel in a manner more fully set forth in the aforesaid Knebusch application. By suitable construction and rotation of the reel, the thread may be caused to progress from the rear of the reel to the front, or from right to left in Figure 2, in which case, because of the cantilever construction of the reel, great convenience results in manipulation of the thread.

Each reel may be mounted and driven in any suitable manner. In the apparatus shown in Figure 1, for example, each reel frame member 27 is mounted on the wall of a housing 43 in which is contained driving mechanism for each reel. Since the processing machine illustrated in Figure 1 may comprise several adjacent descending series of reels similar to the one shown, each housing 43 may support a plurality of reels arranged in a horizontal series. In this apparatus, each reel drive shaft 11 is given the required rotation by gear 44. If desired, a clutch 45 may be employed in conjunction therewith which may be disengaged when it is desired to disconnect the reel from the driving means. Gear 44 is rotated by gear 46 fixed to a shaft 47 extending longitudinally of the machine, which shaft may drive the gears 45 for all reels in a horizontal series mounted on housing 43. Shaft 47 is shown as being driven from gear 52 by gear 48 fixed thereto, which gear 48 is driven through change gears 49, 50 rotatably mounted on the adjustable arm 51. Gear 52 is rigidly mounted on a short shaft 53 driven by a gear 54 mounted thereon, gear 54 being driven from a gear 55 rotated by drive shaft 56. Drive shaft 56 may thus drive all the horizontal series of reels.

The reel shown in Figures 8, 9 and 10 is of the same general type, and operates in the same manner, as that previously described. However, this reel differs from the previously described reel in that the processing medium may be applied to the thread stored on the reel from the interior of the reel. The processing medium may be either gaseous or liquid. The reel of Figures 8, 9 and 10 is shown as utilized in connection with a dry processing treatment such as drying of the thread. For instance, this reel and its auxiliary apparatus may be employed to dry the thread after the final wet processing on the apparatus of Figure 1. Drying may be accomplished by means of suitable medium, such as heated air. If a heated dry processing medium is used, it is desirable to construct the reel of metal, in which case the reel members may be of cast construction.

As can be seen from Figures 8 and 10, the processing medium may be supplied to the interior of the reel through hollow drive shaft 11a. Ports 58 in the hollow drive shaft 11a communicate with the chamber 59 in the interior of concentric reel member 9a, while holes 61 through the walls 62 of this chamber communicate with the exterior of the reel and thus permit the processing medium to reach the thread stored on the reel. The holes 61 may be of such number and so positioned, preferably between the bar members 12a of member 9a, that they supply processing medium over substantially the entire circumference of the reel and for a substantial length of the reel. If a heated drying medium such as heated air, is used, it may be desirable to make the walls 62 of the concentric reel member 9a relatively thick. The construction of member 9a may be otherwise similar to that of member 9 of the previously described reel, as shown in Figure 5.

Member 9a may be mounted on and driven by drive shaft 11a in the manner shown; that is, the shaft 11a may extend to the free end of member 9a, the open end of the shaft 11a being closed by the plug bolt 63 threaded therein. Bolt 63 also serves to hold the member 9a against the pin 21a, thus locating member 9a longitudinally of the shaft 11a and providing means for rotating the reel member 9a, since the pin 21a may be positioned in a slot 19a in the member 9a. If desired, a sealing member 65 and collar 66 may be provided, as in the arrangement shown, to prevent leakage of processing medium past the shaft and into the reel bearings.

The eccentric reel member 10a may be identical with member 10 of the previously described reel, as shown in Figure 7, and may comprise an annular supporting member 22a rotatably mounted as by means of sleeve 28a bearing on the bushing 29a in the desired offset and inclined position on frame member 27a, on which annular supporting member 22a is mounted the cage-like member 24a as by bolts 23a. Cage-like members 24a may, as previously described, be comprised of an annular supporting ring 25a from which extend the bar member 13a. As in the previously described embodiment of the invention, it is desirable to impart rigidity to the bar members 13a by annular reinforcing means spaced from the supported ends of the bar members, such, for example, as the annular rib 26a at the ends of the bar members 13a. If, as in the present embodiment, the cage-like member 24a is of cast construction, the annular rib 26a may be formed integral with the bar members, thus imparting great rigidity thereto, or as has been mentioned, the annular reinforcing means may be fastened to the bar members in various other ways.

If desired, suitable sealing means such as bellows-like sealing member 39a may be provided to enclose that portion of the reel mechanism at the junction of reel members 9a and 10a to prevent the entrance of processing medium or the escape of lubricant.

When a reel of this type is devoted to a dry processing treatment, such as drying of the thread, it is desirable to provide an enclosure about the reel to prevent excessive consumption of processing medium, intensify the action of the medium, as well as provide means for recovering the medium, if desired. Thus in Figures 8 and 9 a chamber 67 is shown positioned about the reel. This chamber may be of any suitable design, such as the one illustrated, in which the front wall 68 and part of the top wall 69 are formed integral and hinged at one side of the front wall as shown, so the chamber may be opened for threading up of the reel.

When the chamber is thus open, it is a simple matter to start the thread 2 on the reel at the rear thereof and lead it out at the front of the chamber as through slot 70 in the bottom of the chamber after the thread has progressed across the reel, as shown by the dotted lines 2'. When the chamber is closed, interference of the thread with the top wall 69 of the chamber is prevented by a suitably-shaped slot 71 therein, while the slot 70 in the bottom of the chamber may be substantially closed by the extending portion 72 at the bottom of the front portion 68. Suitable latch means 73 may be provided to keep the chamber closed. If desired, an exit conduit 74 may be supplied through which the processing medium may be withdrawn to be recirculated, etc., if desired.

The materials of which the reel members are made are, of course, in part dependent upon the use to which the reel is to be put. Thus if the reel is to be used in a liquid processing treatment where liquids may be corrosive, as in the case of the apparatus illustrated in Figure 1, it may be desirable to use some material not affected by such corrosive action, such as hard rubber, Bakelite or other suitable plastic materials capable of being molded. The reel of Figures 2 to 4 has been illustrated as made of such a material. If the reel is employed in some operation which permits the parts thereof to be made of metal, the reel members may be cast; preferably, die-cast for reasons later to be explained. The reel of Figures 8 to 10, which may be used for dry processing of the thread, may thus be made up of die-cast members.

It is apparent from the drawings and foregoing description that reels of the herein-described forms lend themselves very readily to the aforementioned molded or cast constructions. If the reel members are molded of suitable plastics or die-cast of metal the design of the molds or dies and the general procedure of molding or casting may be similar. For instance, concentric reel member 9 and cage-like member 24 of concentric reel member 10 may be readily cast or molded in a two-part mold or suitable design, the draft of the molds or dies being in the direction of the axes of said members. The casting or molding of annular supporting member 22 presents no difficulties in either case.

Members of the reel so molded or die-cast require very little if any finishing before final assembly, since they can thus be molded or cast to a high degree of accuracy and smoothness. In addition, the molding or casting of reel members results in lower costs for the reels in cases where large numbers of reels are to be made; great uniformity as to size, shape, etc. of corresponding reel members and consequent uniformity of operation of the reels; and a high degree of the rigidity desirable in the members of reels of this type. To those engaged in the art to which the invention pertains such a construction has been found to appeal as offering still other advantages.

A further advantage of a reel of this type lies in the fact that it is readily and quickly demountable for cleaning, inspection, replacement, etc. By removal of nut 17 in the reel shown in Figure 2 or by removal of plug bolt 63 in the reel shown in Figure 8, the two generally cylindrical members 9 and 10, or 9a and 10a, as the case may be, may be slid off the drive shaft and frame member after which they may be easily disassembled by removing the annular supporting member 22 from cage-like member 24, thus allowing the concentric member to be removed from within the eccentric member. Remounting of the reel is equally simple. Other advantages of the invention will be apparent to those skilled in the art.

While two embodiments of the invention have been described in connection with the processing of artificial silk thread, these reels are not necessarily restricted to such employment, but are adapted to a wide variety of uses in other fields.

Various modifications in the reels shown, and various other reels embodying the invention, may be devised without departing from the spirit of the invention. In the appended claims, the term "thread" is intended to include, besides thread, filaments, ropes, bands, tubes and similar articles which may be wound on reels of this type. The term "molded" in the appended claims is intended to comprehend both cast and molded constructions. As employed in the claims in connection with the definition of the reel members, the term "generally cylindrical" is not used in its geometric sense, but is intended to comprehend various contours other than that shown in the drawings characterized by cross-sections that may be said to be generally circular.

It is intended that the patent shall cover, by suitable expression in the appended claims, whatever features of patentable novelty reside in the invention.

What is claimed is:

1. A cantilever thread-advancing reel comprising a first rotatable generally cylindrical reel member embodying a set of spaced bar members extending longitudinally of said reel member from the supported to the unsupported end of the reel, a reinforcing member attached to said bar members interiorly of the periphery of said reel member toward the unsupported end of the reel, and an annular member attached to said bar members exteriorly of the periphery of said reel member toward the supported end of the reel, and, cooperating with said first reel member, a second rotatable generally cylindrical reel member embodying a set of spaced, parallel bar members which extend longitudinally of said reel member from the supported to the unsupported end of the reel and which are disposed alternately to the bar members of said first reel member.

2. A thread-advancing reel of the character described in claim 1 in which both generally cylindrical reel members are of wholly rigid construction.

3. A thread-advancing reel of the character described in claim 1 in which both generally cylindrical reel members are of molded construction.

4. A cantilever thread-advancing reel comprising two rotatable generally cylindrical reel members each of which embodies a set of bar members, the bar members of said reel members alternating with each other; means for mounting the reel from one end only in such manner as to leave the other end thereof substantially unobstructed; and, located toward the supported end of the reel, an exteriorly disposed annular member rigidly fixed to the bar members of one of said reel members.

5. A thread-advancing reel of the character described in claim 4 in which both generally cylindrical reel members are of wholly rigid construction.

6. A thread-advancing reel of the character described in claim 4 in which both generally cylindrical reel members are of molded construction.

7. A rigid reel member constituting one element of a cantilever thread-advancing reel comprising a generally cylindrical set of spaced, parallel bar members, a reinforcing member attached to said bar members interiorly of the periphery of the reel member at the end thereof disposed at the unsupported end of the reel, and an annular member attached to said bar members exteriorly of the periphery of the reel member at the end thereof disposed at the supported end of the reel.

8. A reel member of the character described in claim 7 which is of integral construction.

9. A reel member of the character described in claim 7 which is of molded construction.

10. A reel member of the character described in claim 7 to which is rigidly affixed a longitudinally extending bearing sleeve.

11. A cantilever thread-advancing reel comprising two rotatable generally cylindrical reel members each of which embodies a set of bar members, the bar members of said reel members alternating with each other; means for mounting the reel from one end only in such manner as to leave the other end thereof substantially unobstructed; and, located toward the unsupported end of the reel, an internal reinforcing member rigidly fixed to the bar members of one of said reel members.

12. A thread-advancing reel of the character described in claim 11 in which both generally cylindrical reel members are of wholly rigid construction.

13. A thread-advancing reel of the character described in claim 11 in which both generally cylindrical reel members are of molded construction.

14. A rigid reel member constituting one element of a thread-advancing reel comprising a set of spaced, longitudinally extending bar members the outer surfaces of which define a generally cylindrical periphery; a first reinforcing member rigidly fixed to said bar members at one end of the set, the maximum diameter of said reinforcing member being no greater than the external diameter of the generally cylindrical periphery defined by said bar members; and a second reinforcing member rigidly fixed to said bar members at the other end of the set, the minimum diameter of said second reinforcing member being at least as great as the external diameter of the generally cylindrical periphery defined by said bar members.

15. A reel member of the character described in claim 14 which is of integral construction.

16. A reel member of the character described in claim 14 which is of molded construction.

17. A reel member of the character described in claim 14 to which is rigidly affixed a longitudinally extending bearing sleeve.

18. A rigid reel member constituting one element of a thread-advancing reel comprising a set of spaced, longitudinally extending bar members the outer surfaces of which define a periphery of generally circular cross-section; a reinforcing member rigidly affixed to the bar members of said set at one end thereof; and a second reinforcing member rigidly affixed to the bar members of said set at the other end thereof and having an opening therein at least as great in size as the external diameter of said set of bar members in the vicinity of said reinforcing member.

19. A thread-advancing reel comprising a first reel member embodying a rigid set of spaced, longitudinally extending bar members which are supported from one end only of said reel member, the outer surfaces of which bar members define a periphery of generally circular cross-section, a first reinforcing member rigidly fixed to the bar members of said set at the supported end thereof, and a second reinforcing member rigidly fixed to the bar members of said set at the unsupported end thereof; and a second reel member embodying a set of spaced, longitudinally extending bar members the outer surfaces of which define a periphery of generally circular cross-section, the bar members of said second reel member being alternately disposed between those of said first reel member.

20. A cantilever thread-advancing reel comprising a first reel member embodying a rigid set of spaced, longitudinally extending bar members which are supported from one end only of said reel member at a point adjacent the supported end of the reel, the outer surfaces of which bar members define a periphery of generally circular cross-section, and a reinforcing member at the unsupported end of said reel; and a second reel member embodying a set of spaced, longitudinally extending bar members the outer surfaces of which define a periphery of generally circular cross-section, the bar members of said second reel member being alternately disposed between those of said first reel member.

LAVERN J. JORDAN.